(12) United States Patent
Sakalley et al.

(10) Patent No.: US 10,402,111 B1
(45) Date of Patent: Sep. 3, 2019

(54) SYSTEMS AND METHODS FOR DATA STORAGE COMPRESSION

(71) Applicant: Xilinx, Inc., San Jose, CA (US)

(72) Inventors: Deboleena Sakalley, Hyderabad (IN); Ramesh R. Subramanian, Hyderabad (IN); Gopikrishna Jandhyala, Hyderabad (IN); Santosh Singh, Hyderabad (IN); Seong Hwan Kim, San Jose, CA (US)

(73) Assignee: XILINX, INC., San Jose, CA (US)

( * ) Notice: Subject to any disclaimer, the term of this patent is extended or adjusted under 35 U.S.C. 154(b) by 113 days.

(21) Appl. No.: 15/676,083

(22) Filed: Aug. 14, 2017

(51) Int. Cl.
*G06F 3/06* (2006.01)
*G06F 13/42* (2006.01)

(52) U.S. Cl.
CPC ............ *G06F 3/064* (2013.01); *G06F 3/0608* (2013.01); *G06F 3/0683* (2013.01); *G06F 13/4282* (2013.01)

(58) Field of Classification Search
CPC ... G06F 3/0608; G06F 3/0683; G06F 13/4282
See application file for complete search history.

(56) References Cited

U.S. PATENT DOCUMENTS

| | | | | |
|---|---|---|---|---|
| 8,554,745 B2 * | 10/2013 | Pawar | ................. | G06F 12/0804 707/693 |
| 9,430,156 B1 * | 8/2016 | Shilane | ................. | G06F 3/0611 |
| 9,665,302 B1 * | 5/2017 | Huff | ......................... | G06F 3/064 |
| 2014/0237201 A1 * | 8/2014 | Swift | .................... | G06F 3/0608 709/246 |
| 2014/0347331 A1 * | 11/2014 | Amit | ........................ | G09G 5/00 345/204 |
| 2015/0100556 A1 * | 4/2015 | Sekiguchi | ............... | H03M 7/30 707/693 |
| 2015/0198485 A1 * | 7/2015 | Kim | ......................... | G01K 7/01 374/178 |
| 2015/0304441 A1 * | 10/2015 | Ichien | ................. | H03M 7/6094 709/247 |
| 2016/0029024 A1 * | 1/2016 | Shand | ................... | H04N 19/176 375/240.01 |
| 2017/0255402 A1 * | 9/2017 | Narasimha | .......... | G06F 12/1408 |
| 2017/0286220 A1 * | 10/2017 | Gerhard | .............. | G06F 11/1076 |
| 2018/0138921 A1 * | 5/2018 | Arelakis et al. | ......... | G06T 9/007 382/232 |
| 2018/0167083 A1 * | 6/2018 | Dubey | ................ | H03M 7/3059 |

\* cited by examiner

*Primary Examiner* — Henry Tsai
*Assistant Examiner* — Christopher Daley
(74) *Attorney, Agent, or Firm* — David W. O'Brien (57) ABSTRACT

A data storage system includes a bridging device. The bridging device is configured to receive, from a host through a network, a host data block size. A sub-block size is determined based on the host data block size. One or more storage devices are configured to include a plurality of storage sub-blocks each having the sub-block size. A first write command to write first host data including a first number of host data blocks to the one or more storage devices is received. The bridging device compresses the first host data to generate first compressed data, and write the first compressed data to a second number of storage sub-blocks of the one or more storage devices.

20 Claims, 9 Drawing Sheets

SYSTEMS AND METHODS FOR DATA STORAGE COMPRESSION

TECHNICAL FIELD

Examples of the present disclosure generally relate to data storage and, in particular, to systems and methods for accessing storage devices over a network.

BACKGROUND

In a storage system including an initiator (e.g., a host) and a target sub-system including target storage devices, compression may be used to reduce the memory footprint and the network bandwidth. The compression may be performed at the initiator of the storage system, which may lead to a smaller footprint throughout the storage system. However, certain applications and system requirements prevent enabling compression/decompression at the initiator. In those cases, it may become imperative to enable compression/decompression at the target storage devices, especially for applications requiring huge data storage capacities. However, compression at the target storage devices may be challenging. For example, the target storage devices may include block storage devices where data reads and writes are performed in blocks, and the initiator and the target storage devices may communicate in blocks. As such, after the incoming block of host data is compressed at the target storage devices, the resulting compressed data may be written to the target storage devices in the same block size as that of the incoming block. Therefore, the compression savings may not translate to more free blocks in the target storage devices.

Accordingly, it would be desirable and useful to provide an improved storage system.

SUMMARY

In some embodiments in accordance with the present disclosure, a data storage system includes a bridging device configured to: receive, from a host through a network, a host data block size of a host data block associated with the host; determine a sub-block size based on the host data block size; configure one or more storage devices so that the one or more storage devices include a plurality of storage sub-blocks each having the sub-block size; receive, from the host, a first write command to write first host data including a first number of host data blocks to the one or more storage devices; compress the first host data to generate first compressed data; and write the first compressed data to a second number of storage sub-blocks of the one or more storage devices.

In some embodiments, the first host data includes a first host data block. The first compressed data is generated by compressing the first host data block.

In some embodiments, the bridging device is further configured to: prior to the compressing the first host data, determine a third number of best-case sub-blocks based on a best-case compression ratio for the first host data; and after the compressing the first host data, determine best-case compression data of the first compressed data based on the best-case compression ratio; and write the best-case compression data to the third number of best-case sub-blocks.

In some embodiments, the bridging device is further configured to: prior to the compressing the first host data, assign a fourth number of overflow sub-blocks for the first host data; store overflow sub-block information corresponding to the fourth number of overflow sub-blocks in an overflow sub-block table; after the compressing the first host data, determine overflow compression data of the first compressed data based on the best-case compression data; write the overflow compression data to at least a portion of the fourth number of overflow sub-blocks; and update the overflow sub-block information corresponding to the at least a portion of the fourth number of overflow sub-blocks in the overflow sub-block table.

In some embodiments, the first host data includes a first batch including a first host data block and a second host data block. The bridging device is configured to: merge the first host data block and the second host data block to generate a compression block; and compress the compression block to generate the first compressed data.

In some embodiments, the bridging device is configured to: determine that the first host data block has a first host data block size and the second host data block has a second host data block size different from the first host data block size; generate a descriptor including the first and second host data block sizes; and write the descriptor to a descriptor sub-block of the storage devices.

In some embodiments, the bridging device is configured to: generate a descriptor including merge information associated with the first and second host data block; and write the descriptor to a descriptor sub-block of the storage devices.

In some embodiments, the bridging device is configured to: receive, from the host through the network, a host read command to read the first batch from the one or more storage devices; perform a first read command to retrieve first read data from the third number of best-case sub-blocks; retrieve, from the overflow sub-block table, overflow sub-block information associated with the at least a portion of the fourth number of overflow sub-blocks; perform a second read command to retrieve second read data from the one or more storage devices based on the retrieved overflow sub-block information; merge the first read data and second read data to generate merged read data; decompress the merged read data to generate decompressed data; and send, to the host through the network, the decompressed data in blocks having the host data block size.

In some embodiments, the bridging device is configured to: retrieve, from the one or more storage devices, the descriptor associated with the first batch; reconstruct the first host data block and the second host data block from the decompressed data using the descriptor; and send, to the host through the network, the reconstructed first host data block and the second host data block.

In some embodiments, the sub-block size is 1/N of the host data block size, where N is an integer greater than one.

In some embodiments, the data storage system includes a Peripheral Component Interconnect Express (PCIe) switch fabric configured to connect the bridging device and the one or more storage devices.

In some embodiments, a method includes receiving, from a host through a network, a host data block size of a host data block associated with the host; determining a sub-block size based on the host data block size; configuring one or more storage devices so that the one or more storage devices include a plurality of storage sub-blocks each having the sub-block size; receiving, from the host, a first write command to write first host data including a first number of host data blocks to the one or more storage devices; compressing the first host data to generate first compressed data; and writing the first compressed data to a second number of storage sub-blocks of the one or more storage devices.

In some embodiments, the method includes prior to the compressing the first host data, determining a third number of best-case sub-blocks based on a best-case compression ratio for the first host data; and after the compressing the first host data, determining best-case compression data of the first compressed data based on the best-case compression ratio; and writing the best-case compression data to the third number of best-case sub-blocks.

In some embodiments, the method includes prior to the compressing the first host data, assigning a fourth number of overflow sub-blocks for the first host data; storing overflow sub-block information corresponding to the fourth number of overflow sub-blocks in an overflow sub-block table; after the compressing the first host data, determining overflow compression data of the first compressed data based on the best-case compression data; writing the overflow compression data to at least a portion of the fourth number of overflow sub-blocks; and updating the overflow sub-block information corresponding to the at least a portion of the fourth number of overflow sub-blocks in the overflow sub-block table.

In some embodiments, the first host data includes a first batch including a first host data block and a second host data block. The method includes merging the first host data block and the second host data block to generate a compression block; and compressing the compression block to generate the first compressed data.

In some embodiments, the method includes determining that the first host data block has a first host data block size and the second host data block has a second host data block size different from the first host data block size; generating a descriptor including the first and second host data block sizes; and writing the descriptor to a descriptor sub-block of the storage devices.

In some embodiments, the method includes generating a descriptor including merge information associated with the first and second data blocks; and writing the descriptor to a descriptor sub-block of the storage devices.

In some embodiments, the method includes receiving, from the host through the network, a host read command to read the first batch from the one or more storage devices; performing a first read command to retrieve first read data from the third number of best-case sub-blocks; retrieving, from the overflow sub-block table, overflow sub-block information associated with the at least a portion of the fourth number of overflow sub-blocks; performing a second read command to retrieve second read data from the one or more storage devices based on the retrieved overflow sub-block information; merging the first read data and second read data to generate merged read data; decompressing the merged read data to generate decompressed data; and sending, to the host through the network, the decompressed data in blocks having the host data block size.

In some embodiments, the method includes retrieving, from the descriptor sub-block of the storage devices, the descriptor; reconstructing the first host data block and the second host data block from the decompressed data using the descriptor; and sending, to the host through the network, the reconstructed first host data block and second host data block.

In some embodiments, the method includes communicating, through a Peripheral Component Interconnect Express (PCIe) switch fabric, with the one or more storage devices.

Other aspects and features will be evident from reading the following detailed description and accompanying drawings.

DETAILED DESCRIPTION

Various embodiments are described hereinafter with reference to the figures, in which exemplary embodiments are shown. The claimed invention may, however, be embodied in different forms and should not be construed as being limited to the embodiments set forth herein. Like reference numerals refer to like elements throughout. Like elements will, thus, not be described in detail with respect to the description of each figure. It should also be noted that the figures are only intended to facilitate the description of the embodiments. They are not intended as an exhaustive description of the claimed invention or as a limitation on the scope of the claimed invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described. The features, functions, and advantages may be achieved independently in various embodiments or may be combined in yet other embodiments.

Before describing exemplary embodiments illustratively depicted in the several figures, a general introduction is provided to further understanding. As discussed above, in a storage system where hosts access target storage devices through a network, compression performed at the target storage devices may be challenging. For example, the compression savings may not translate to more free blocks at the target storage devices when the hosts and the target storage devices communicate in data blocks having the same block size. Furthermore, compression algorithms usually provide varying rates of compression. As a result, the final size of the compressed data may not be known before compression, which increases the difficulty of assigning free blocks of the target storage devices to the incoming data from the hosts. It has been discovered that a bridging device may be used in the target sub-system to perform the compression and provide the compressed data to the target storage devices. By performing the compression process in the bridging device instead of in the target storage devices, better write performance may be achieved without adding additional latency.

With the above general understanding borne in mind, various embodiments for implementing a storage system are described below. Various advantages may be present in various applications of the present disclosure. No particular advantage is required for all embodiments, and different embodiments may offer different advantages. One of the advantages in some embodiments is that by using a bridging device in the target subsystem of the storage system, better read and write performance of the storage system is achieved. For example, compression and mapping no longer need to be performed on each target storage device. Instead, the bridging device may perform the compression and mapping for all the target storage devices. For further example, the bridging device may perform the compression on the fly using its own compression engine and resources (e.g., metadata map) without accumulating input blocks from the host so that the compressed data for the accumulated input blocks may fit in the storage device blocks. As such, the bridging device may not add additional latency to a write operation. Another advantage in some embodiments is that by using the bridging device, the compression may be implemented to increase the storage capacity while maintaining a unified data block size for the host's view. For example, the bridging device may configure the target storage devices with a sub-block size based on the block size of the host data blocks, such that the compressed data may be written to sub-blocks of the target storage devices while the host and the bridging device remain communicating in the same block size. For further example, by using a bridging device, a target block storage device having a capacity of N blocks may be presented as a block storage device having a capacity of M times N blocks, where M is a number greater than one (e.g., 1.5) and N is a positive integer.

Because one or more of the above-described embodiments are exemplified using a particular type of IC, a detailed description of such an IC is provided below. However, it should be understood that other types of ICs may benefit from one or more of the embodiments described herein.

Programmable logic devices ("PLDs") are a well-known type of integrated circuit that can be programmed to perform specified logic functions. One type of PLD, the field programmable gate array ("FPGA"), typically includes an array of programmable tiles. These programmable tiles can include, for example, input/output blocks ("IOBs"), configurable logic blocks ("CLBs"), dedicated random access memory blocks ("BRAMs"), multipliers, digital signal processing blocks ("DSPs"), processors, clock managers, delay lock loops ("DLLs"), and so forth. As used herein, "include" and "including" mean including without limitation.

Each programmable tile typically includes both programmable interconnect and programmable logic. The programmable interconnect typically includes a large number of interconnect lines of varying lengths interconnected by programmable interconnect points ("PIPs"). The programmable logic implements the logic of a user design using programmable elements that can include, for example, function generators, registers, arithmetic logic, and so forth.

The programmable interconnect and programmable logic are typically programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA.

Another type of PLD is the Complex Programmable Logic Device, or complex programmable logic devices (CPLDs). A CPLD includes two or more "function blocks" connected together and to input/output ("I/O") resources by an interconnect switch matrix. Each function block of the CPLD includes a two-level AND/OR structure similar to those used in Programmable Logic Arrays ("PLAs") and Programmable Array Logic ("PAL") devices. In CPLDs, configuration data is typically stored on-chip in non-volatile memory. In some CPLDs, configuration data is stored on-chip in non-volatile memory, then downloaded to volatile memory as part of an initial configuration (programming) sequence.

In general, each of these programmable logic devices ("PLDs"), the functionality of the device is controlled by configuration data provided to the device for that purpose. The configuration data can be stored in volatile memory (e.g., static memory cells, as common in FPGAs and some CPLDs), in non-volatile memory (e.g., FLASH memory, as in some CPLDs), or in any other type of memory cell.

Other PLDs are programmed by applying a processing layer, such as a metal layer, that programmably interconnects the various elements on the device. These PLDs are known as mask programmable devices. PLDs can also be implemented in other ways, e.g., using fuse or antifuse technology. The terms "PLD" and "programmable logic device" include but are not limited to these exemplary devices, as well as encompassing devices that are only partially programmable. For example, one type of PLD includes a combination of hard-coded transistor logic and a programmable switch fabric that programmably interconnects the hard-coded transistor logic.

Figure 1:
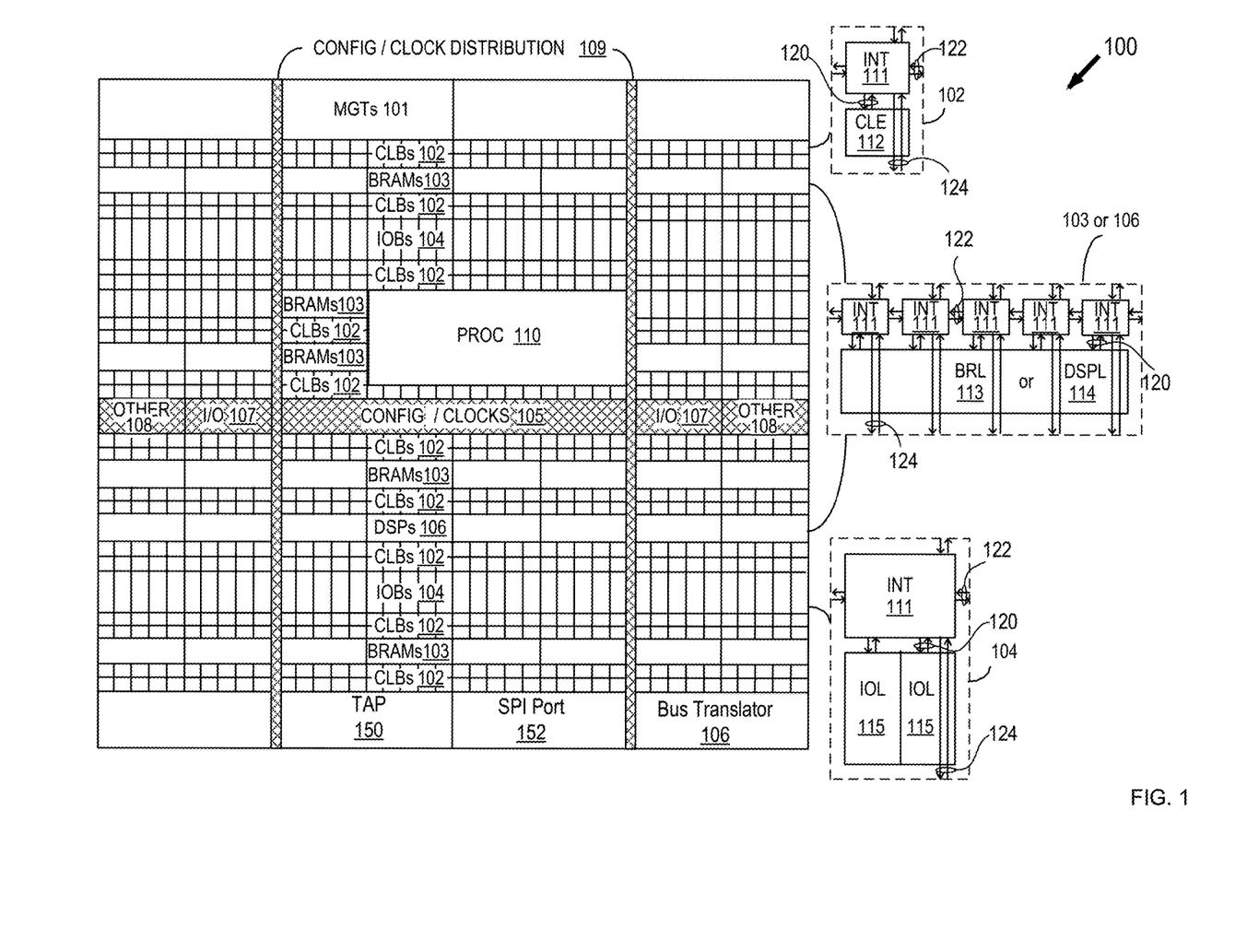
FIG. 1 is a block diagram illustrating an exemplary architecture for an IC according to some embodiments of the present disclosure.

As noted above, advanced FPGAs can include several different types of programmable logic blocks in the array. For example, FIG. 1 illustrates an exemplary FPGA architecture 100. The FPGA architecture 100 includes a large number of different programmable tiles, including multi-gigabit transceivers ("MGTs") 101, configurable logic blocks ("CLBs") 102, random access memory blocks ("BRAMs") 103, input/output blocks ("IOBs") 104, configuration and clocking logic ("CONFIG/CLOCKS") 105, digital signal processing blocks ("DSPs") 106, specialized input/output blocks ("I/O") 107 (e.g., configuration ports and clock ports), and other programmable logic 108 such as digital clock managers, analog-to-digital converters, system monitoring logic, and so forth. Some FPGAs also include dedicated processor blocks ("PROC") 110.

In some FPGAs, each programmable tile can include at least one programmable interconnect element ("INT") 111 having connections to input and output terminals 120 of a programmable logic element within the same tile, as shown by examples included at the top of FIG. 1. Each programmable interconnect element 111 can also include connections to interconnect segments 122 of adjacent programmable interconnect element(s) in the same tile or other tile(s). Each programmable interconnect element 111 can also include connections to interconnect segments 124 of general routing resources between logic blocks (not shown). The general routing resources can include routing channels between logic blocks (not shown) comprising tracks of interconnect segments (e.g., interconnect segments 124) and switch blocks (not shown) for connecting interconnect segments. The interconnect segments of the general routing resources (e.g., interconnect segments 124) can span one or more logic blocks. The programmable interconnect elements 111 taken together with the general routing resources implement a programmable interconnect structure ("programmable interconnect") for the illustrated FPGA.

In an example implementation, a CLB 102 can include a configurable logic element ("CLE") 112 that can be programmed to implement user logic plus a single programmable interconnect element ("INT") 111. A BRAM 103 can include a BRAM logic element ("BRL") 113 in addition to one or more programmable interconnect elements. Typically, the number of interconnect elements included in a tile depends on the height of the tile. In the pictured example, a BRAM tile has the same height as five CLBs, but other numbers (e.g., four) can also be used. A DSP tile 106 can include a DSP logic element ("DSPL") 114 in addition to an appropriate number of programmable interconnect elements. An 10B 104 can include, for example, two instances of an input/output logic element ("IOL") 115 in addition to one instance of the programmable interconnect element 111. As will be clear to those of skill in the art, the actual I/O pads connected, for example, to the I/O logic element 115 typically are not confined to the area of the input/output logic element 115.

In the example of FIG. 1, an area (depicted horizontally) near the center of the die (e.g., formed of regions 105, 107, and 108 shown in FIG. 1) can be used for configuration, clock, and other control logic. Column 109 (depicted vertically) extending from this horizontal area or other columns may be used to distribute the clocks and configuration signals across the breadth of the FPGA.

Some FPGAs utilizing the architecture illustrated in FIG. 1 include additional logic blocks that disrupt the regular columnar structure making up a large part of the FPGA. The additional logic blocks can be programmable blocks and/or dedicated logic. For example, PROC 110 spans several columns of CLBs and BRAMs. PROC 110 can include various components ranging from a single microprocessor to a complete programmable processing system of microprocessor(s), memory controllers, peripherals, and the like.

In one aspect, PROC 110 is implemented as a dedicated circuitry, e.g., as a hard-wired processor, that is fabricated as part of the die that implements the programmable circuitry of the IC. PROC 110 can represent any of a variety of different processor types and/or systems ranging in complexity from an individual processor, e.g., a single core capable of executing program code, to an entire processor system having one or more cores, modules, co-processors, interfaces, or the like.

In another aspect, PROC 110 is omitted from architecture 100, and may be replaced with one or more of the other varieties of the programmable blocks described. Further, such blocks can be utilized to form a "soft processor" in that the various blocks of programmable circuitry can be used to form a processor that can execute program code, as is the case with PROC 110.

The phrase "programmable circuitry" can refer to programmable circuit elements within an IC, e.g., the various programmable or configurable circuit blocks or tiles described herein, as well as the interconnect circuitry that selectively couples the various circuit blocks, tiles, and/or elements according to configuration data that is loaded into the IC. For example, portions shown in FIG. 1 that are external to PROC 110 such as CLBs 102 and BRAMs 103 can be considered programmable circuitry of the IC.

In some embodiments, the functionality and connectivity of programmable circuitry are not established until configuration data is loaded into the IC. A set of configuration data can be used to program programmable circuitry of an IC such as an FPGA. The configuration data is, in some cases, referred to as a "configuration bitstream." In general, programmable circuitry is not operational or functional without first loading a configuration bitstream into the IC. The configuration bitstream effectively implements or instantiates a particular circuit design within the programmable circuitry. The circuit design specifies, for example, functional aspects of the programmable circuit blocks and physical connectivity among the various programmable circuit blocks.

In some embodiments, circuitry that is "hardwired" or "hardened," i.e., not programmable, is manufactured as part of the IC. Unlike programmable circuitry, hardwired circuitry or circuit blocks are not implemented after the manufacture of the IC through the loading of a configuration bitstream. Hardwired circuitry is generally considered to have dedicated circuit blocks and interconnects, for example, that are functional without first loading a configuration bitstream into the IC, e.g., PROC 110.

In some instances, hardwired circuitry can have one or more operational modes that can be set or selected according to register settings or values stored in one or more memory elements within the IC. The operational modes can be set, for example, through the loading of a configuration bitstream into the IC. Despite this ability, hardwired circuitry is not considered programmable circuitry as the hardwired circuitry is operable and has a particular function when manufactured as part of the IC.

FIG. 1 is intended to illustrate an exemplary architecture that can be used to implement an IC that includes programmable circuitry, e.g., a programmable fabric. For example, the numbers of logic blocks in a row, the relative width of the rows, the number and order of rows, the types of logic blocks included in the rows, the relative sizes of the logic blocks, and the interconnect/logic implementations included at the top of FIG. 1 are purely exemplary. For example, in an actual IC, more than one adjacent row of CLBs is typically included wherever the CLBs appear, to facilitate the efficient implementation of user logic, but the number of adjacent CLB rows varies with the overall size of the IC. Moreover, the FPGA of FIG. 1 illustrates one example of a programmable IC that can employ examples of the interconnect circuits described herein. The interconnect circuits described herein can be used in other types of programmable ICs, such as CPLDs or any type of programmable IC having a programmable interconnect structure for selectively coupling logic elements.

It is noted that the IC that may implement the bridging device is not limited to the exemplary IC depicted in FIG. 1, and that IC having other configurations, or other types of IC, may also implement the bridging device.

Figure 2:
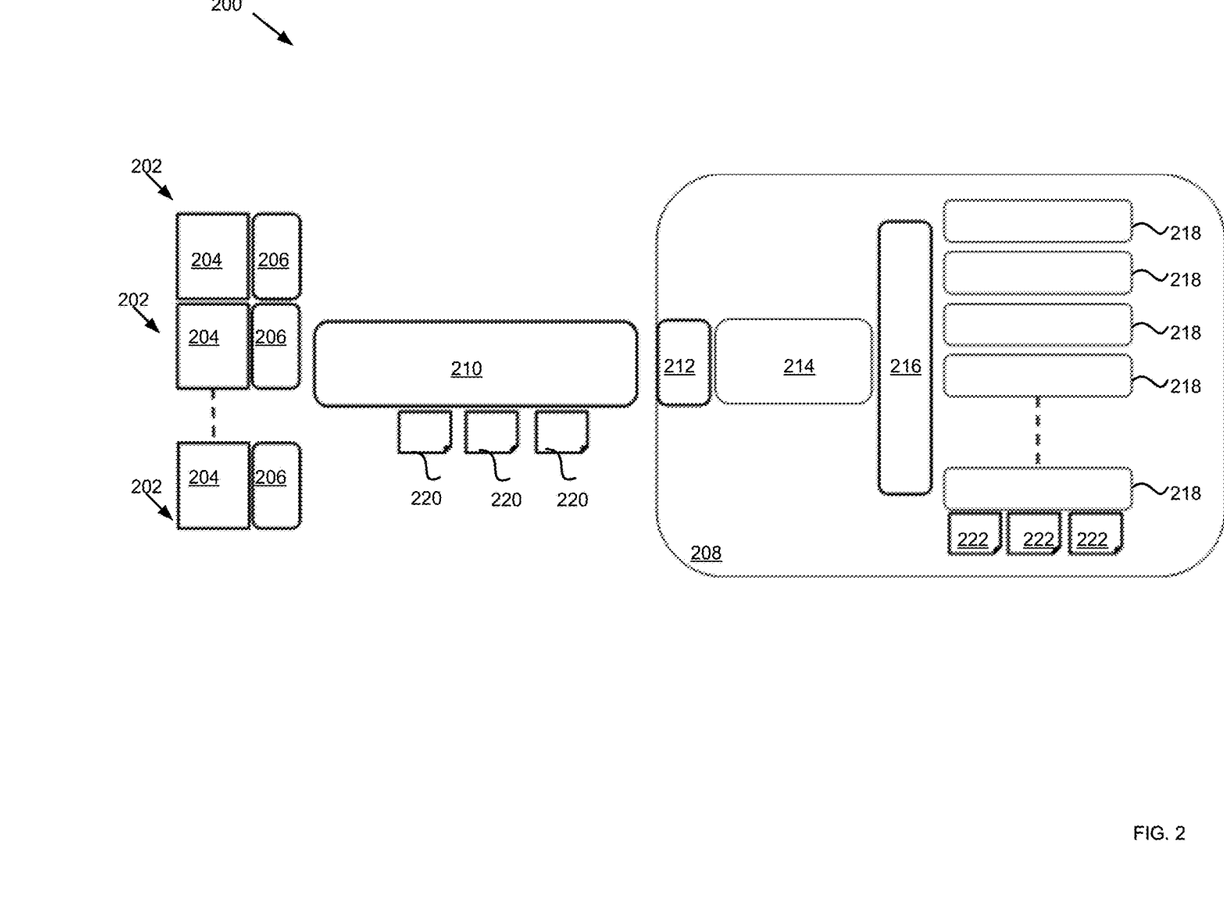
FIG. 2 is a block diagram illustrating an exemplary storage system according to some embodiments of the present disclosure.

Referring to FIG. 2, illustrated is an exemplary storage system 200. The storage system includes one or more hosts 202, each host 202 may include a processor 204 and a network adapter 206 (e.g., a converged network adaptor (CNA) 206). The host 202 may include a computing host, a server, a personal computer, a laptop computer, a notebook computer, a workstation computer, a smartphone, a cellular handset, a media player/recorder, and any other devices including a processor. The hosts 202 may use the network adapters 206 to communicate with a target subsystem 208 through a network fabric 210. The hosts 202 may originate requests to access (e.g., to read from or to write to) storage devices 218 in the target subsystem 208, and therefore may also be referred to as initiators 202. The network fabric 210 may include Ethernet, Fibre Channel, InfiniBand, and/or any other suitable network fabrics.

As shown in FIG. 2, the target subsystem 208 includes a network adapter 212 (e.g., a converged network adapter 212), a bridging device 214 coupled to the network adapter 212, a fabric 216 (e.g., a PCIe switch fabric 216) coupled to the bridging device 214, and a plurality of storage devices 218 coupled to the fabric 216. Each storage device 218 may include a solid-state drive (SSD), a Universal Serial Bus (USB) flash, a non-volatile NAND flash memory, or any other suitable storage devices. The bridging device 214 may be implemented using a programmable logic device (e.g., an FPGA), ASIC, or any other applicable technologies.

Figure 3:
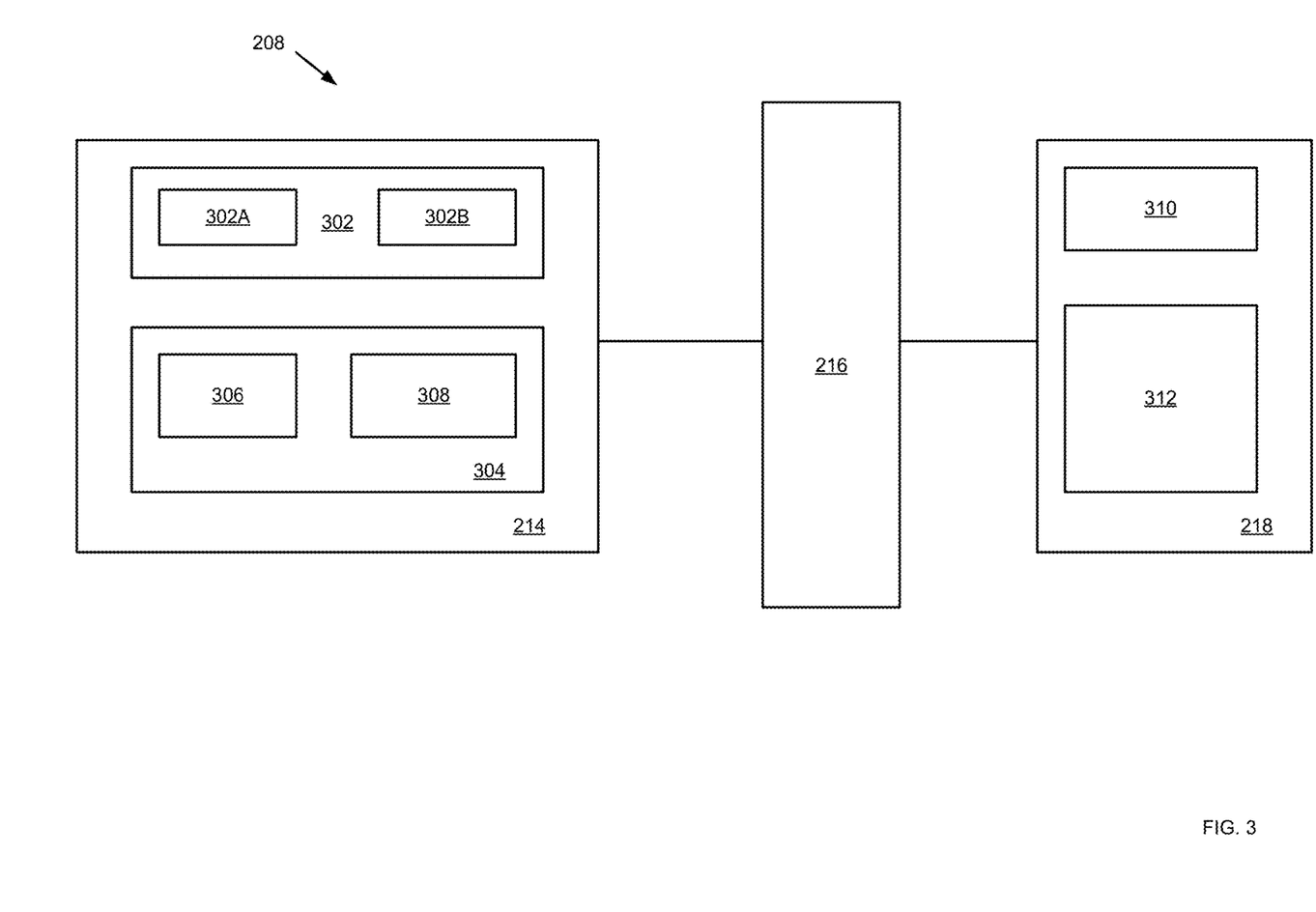
FIG. 3 is a block diagram illustrating a portion of the storage system according to some embodiments of the present disclosure.

Referring to FIG. 3, illustrated is a portion of the target subsystem 208. As illustrated in FIG. 3, the bridging device 214 includes a processor 304 for performing various functions (e.g., compression functions 306, mapping functions 308) and a storage device 302 (also referred to as metadata map 302) for storing various mapping tables used for accessing the storage devices 218. In some embodiments, the storage device 302 includes a non-volatile memory (e.g., a flash memory) and a cache (e.g., a double data rate (DDR) SDRAM). The mapping tables may be saved the cache and/or the non-volatile memory of the storage device 302. In an example, the mapping tables may be written to the non-volatile memory of the storage device 302 when the power of the storage device 302 is to be turned off. In another example, the mapping tables may be saved in one or more blocks of the storage devices 218 (e.g., a mapping table area 310 including a cache and/or non-volatile memory). The storage device 218 may also include a user data area 312 for storing user data (e.g., data received from the hosts 202).

Figure 4:
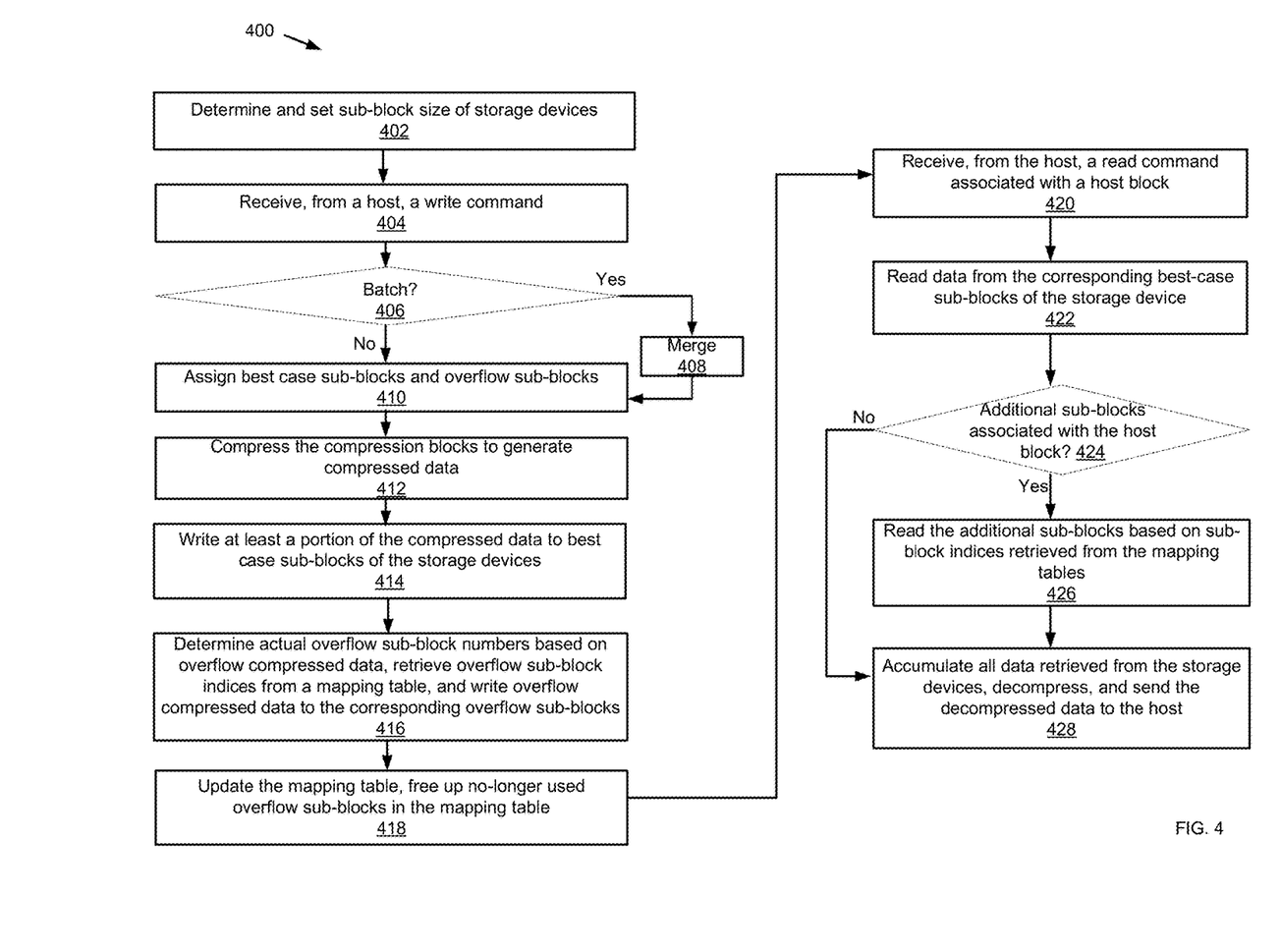
FIG. 4 is a flow diagram of a method for accessing data in a storage system according to some embodiments of the present disclosure.

Referring to FIG. 4, a method 400 for storing and retrieving data from storage devices through network fabrics is described. The method 400 begins at process 402, where a bridging device 214 may set a storage device block size (sub-block size) for the storage devices 218 based on one or more host data block sizes.

Figure 5:
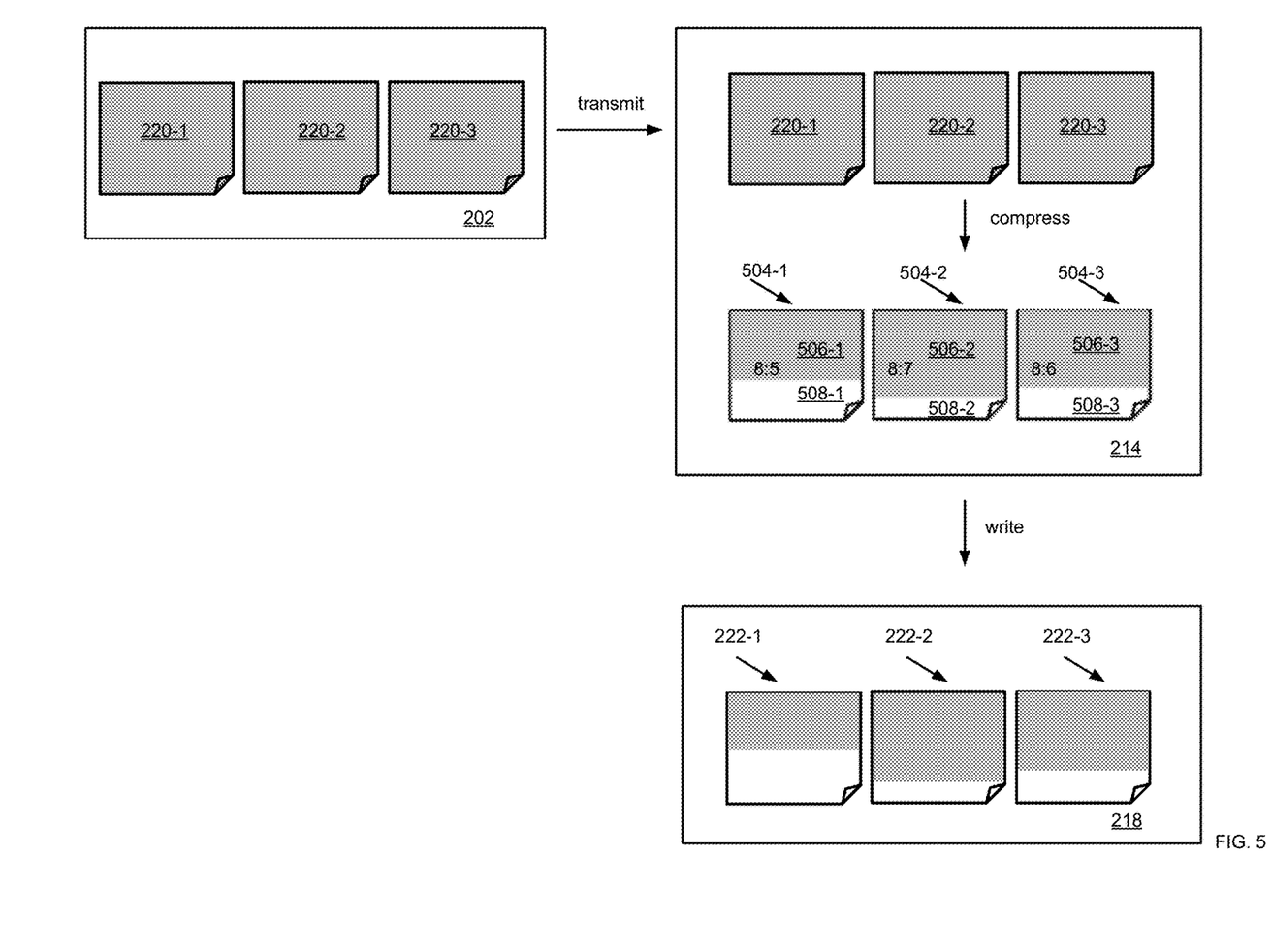
FIG. 5 is a block diagram illustrating a portion of the storage system according to some embodiments of the present disclosure.

Referring to FIG. 5, in some embodiments, the storage device block size may be set to be the same as a host data block size. However, as illustrated in the example of FIG. 5, such a configuration may not fully translate compression savings into more free blocks in the storage devices 218. In the example of FIG. 5, one or more hosts 202 may send a plurality of blocks of data including blocks 220-1, 220-2, and 220-3 to a bridging device 214 through the network adapter 206, the network fabrics 210, and the network adapter 212. Each of the blocks 220-1, 220-2, and 220-3 has a host data block size (e.g., 4K), and may also be referred to as host size blocks 220-1, 220-2, and 220-3. After receiving the host size blocks 220-1, 220-2, and 220-3, the bridging device 214 may compress the received host size blocks 220-1, 220-2, and 220-3 by applying a compression algorithm and generate the compressed blocks 504-1, 504-2, and 504-3 each having the host data block size respectively. The compression algorithm may include a lossless compression algorithm (e.g., Huffman coding, prediction by partial matching (PPM)), and any other suitable compression algorithms.

As shown in FIG. 5, in some embodiments, the compressed blocks 504-1, 504-2, and 504-3 may have different actual compression ratios even when the same compression algorithm is applied to the blocks 220-1, 220-2, and 220-3. The compression ratio may be provided as:

$$\text{compression ratio} = \text{uncompressed size}/\text{compressed size}.$$

The corresponding space savings may be defined:

$$\text{space savings} = 1 - \text{compressed size}/\text{uncompressed size}.$$

In the example of FIG. 5, the compressed block 504-1 includes compressed data 506-1 and compression savings 508-1 having 5/8 and 3/8 of the total size of the compressed block 504-1 respectively. As such, the actual compression ratio and actual space savings for the compressed block 504-1 are 8:5 and 3/8 respectively. The compressed block 504-2 includes compressed data 506-2 and compression savings 508-2 having 7/8 and 1/8 of the total size of the compressed block 504-2 respectively. As such, the actual compression ratio and actual space savings for the compressed block 504-2 are 8:7 and 1/8 respectively. The compressed block 504-3 includes compressed data 506-3 and compression savings 508-3 having 6/8 and 2/8 of the total size of the compressed block 504-3 respectively. As such, the actual compression ratio and actual space savings for the compressed block 504-3 are 8:6 and 2/8 respectively.

In the embodiments of FIG. 5, the bridging device 214 may then store the compressed blocks 504-1, 504-2, and 504-3 in the storage devices 218 (e.g., through the fabric 216). Because the storage devices 218 have a storage device block size (e.g., 4K) that is the same as the host data block size (e.g., 4K), the compressed blocks 504-1, 504-2, and 504-3 are stored in the storage device 218 as storage device blocks 222-1, 222-2, and 222-3, each having a host data block size. In such embodiments, the compression savings 508-1, 508-2, and 508-3 (e.g., 3/8, 1/8, and 2/8 of the storage device blocks 222-1, 222-2, and 222-3 respectively) do not translate into any free storage device blocks in the storage devices 218. The same number of storage device blocks (e.g., 3) are used in the storage device 218 for the compressed data as the number of blocks (e.g., 3) used by the data of the hosts 202.

Figure 6:
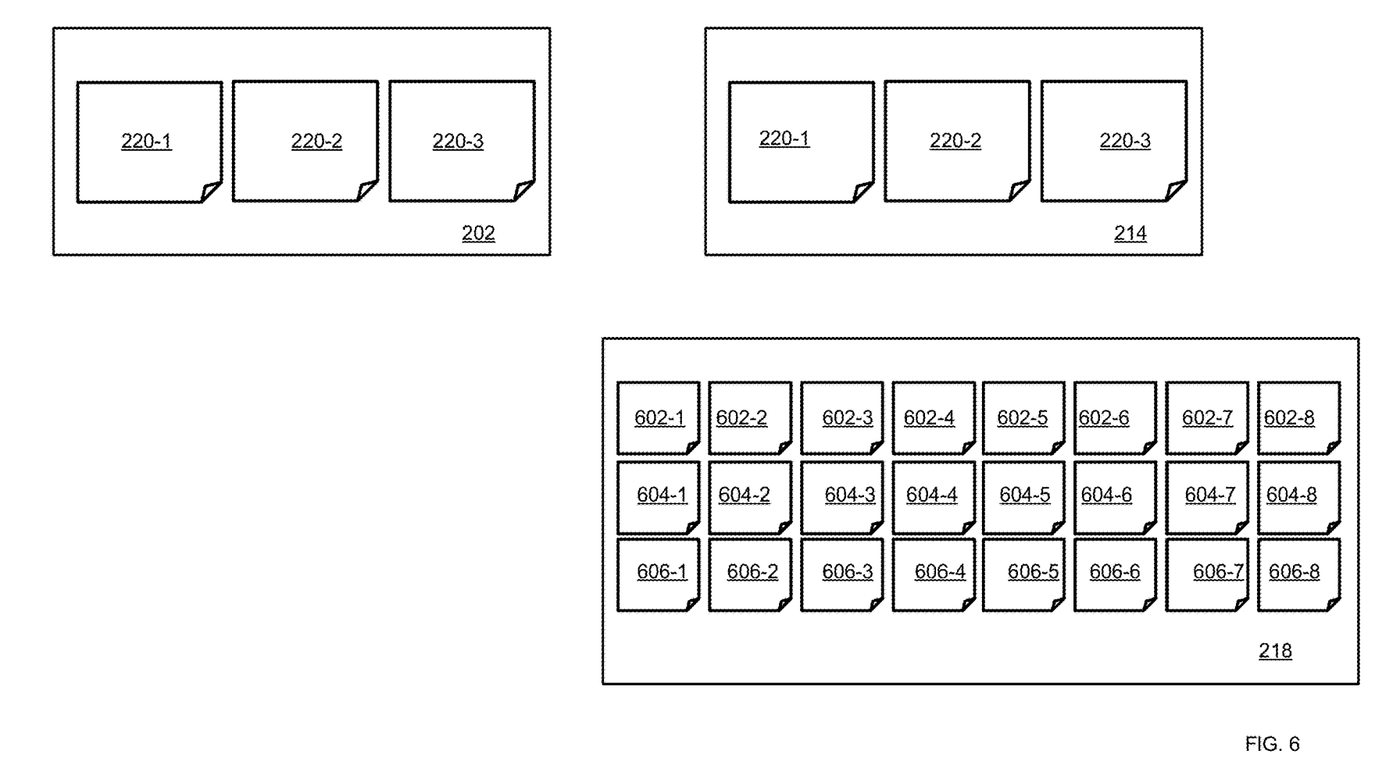
FIG. 6 is a block diagram illustrating a portion of the storage system according to some embodiments of the present disclosure.

To translate the compression savings into free storage device blocks in the storage device 218, in some embodiments, at process 402, the bridging device 214 may configure the storage devices 218 to have a storage device block size that is different from the host data block size. In some embodiments, once the storage device block size of the storage device 218 is configured, that storage device block size may be used to define blocks of the storage device 218 for subsequent operations (e.g., read, write) of the storage device 218. Referring to the example of FIG. 6, the bridging device 214 may configure the storage device block size to be 1/N of the host data block size, where N is an integer greater than 1. As such, a block in the storage device may be referred to as a sub-block, and the storage device block size may be referred to as a sub-block size. In an example where the host data block size is 4 kilobyte (kB) and N is equal to 8, the storage devices 218 may be configured to have a storage device block size equal to 512 bytes. As such, each block with a host data block size may be written into N (e.g., 8) sub-blocks.

In some embodiments, the hosts 202 may provide data in blocks having difference host data block sizes. In some examples, the bridging device 214 may define the sub-block size of the storage device based on an average value of those different block sizes of the received host data blocks. In an example, the bridging device 214 may receive two host data blocks of 4 kB and 8 kB respectively, and determine the sub-block size of the storage device to be 3 kB, which is 1/N (e.g., 1/2) of the average host data block size (e.g., 6 kB), where N is a positive integer. In some examples, the bridging device 214 may determine the sub-block size of the storage device based on the minimum host data block size of the block sizes of a predetermined number of received host data blocks, where the sub-block size equals 1/N of the minimum host data block size. In some examples, the bridging device 214 may determine the sub-block size of the storage device based on the maximum host data block size of the block sizes of a predetermined number of received host data blocks, where the sub-block size equals 1/N of the maximum host data block size.

The method 400 may then proceed to process 404, where the bridging device 214 receives a write command from the hosts 202. The write command may include a plurality of data blocks from the hosts 202, where each data block has a host data block size. The method 400 may then proceed to process 406 to determine whether the storage system 200 is operating in a batch mode. In various embodiments, the batch operation in the storage system 200 is a configurable option and may be configured by an operator.

In some embodiments, after the bridging device 214 determines that the storage system 200 is operating in a batch mode, the method 400 proceeds to process 408, where a merge process is performed to merge a plurality of blocks received from the hosts 202 into one batch. In some embodiments, a batch may be configured to include M host blocks, where M is an integer (e.g., two, three, four) greater than one. In an example where M equals to four and a host block size equals 4 kB, a batch has a size of 16 kB. In some examples, the storage system 200 operates in the batch mode, where the data blocks to be stored to or read from the storage devices are consecutive (e.g., in a video file). Referring to the example of FIG. 7 where M equals to three, the hosts 202 may send the blocks 220-1, 220-2, and 220-3 in a batch to the bridging device 214 through the network fabrics 210. At process 408, the bridging device 214 may merge the received blocks 220-1, 220-2, and 220-3 in a batch received from the hosts 202 into one compression block 702, where the compression block 702 has a size of M*host block size. Such a compression block 702 may be referred to as a super block. In some examples, each of the blocks 220-1, 220-2, and 220-3 in a particular batch has the same block size. Alternatively, in some examples, the blocks 220-1, 220-2, and 220-3 in a particular batch may have different block sizes. The size of the compression block 702 may be the sum of the block sizes of blocks 220-1, 220-2, and 220-3. By merging the blocks 220-1, 220-2, and 220-3 to generate a compression block 702 having a larger size, a better compression ratio may be achieved.

Figure 7:
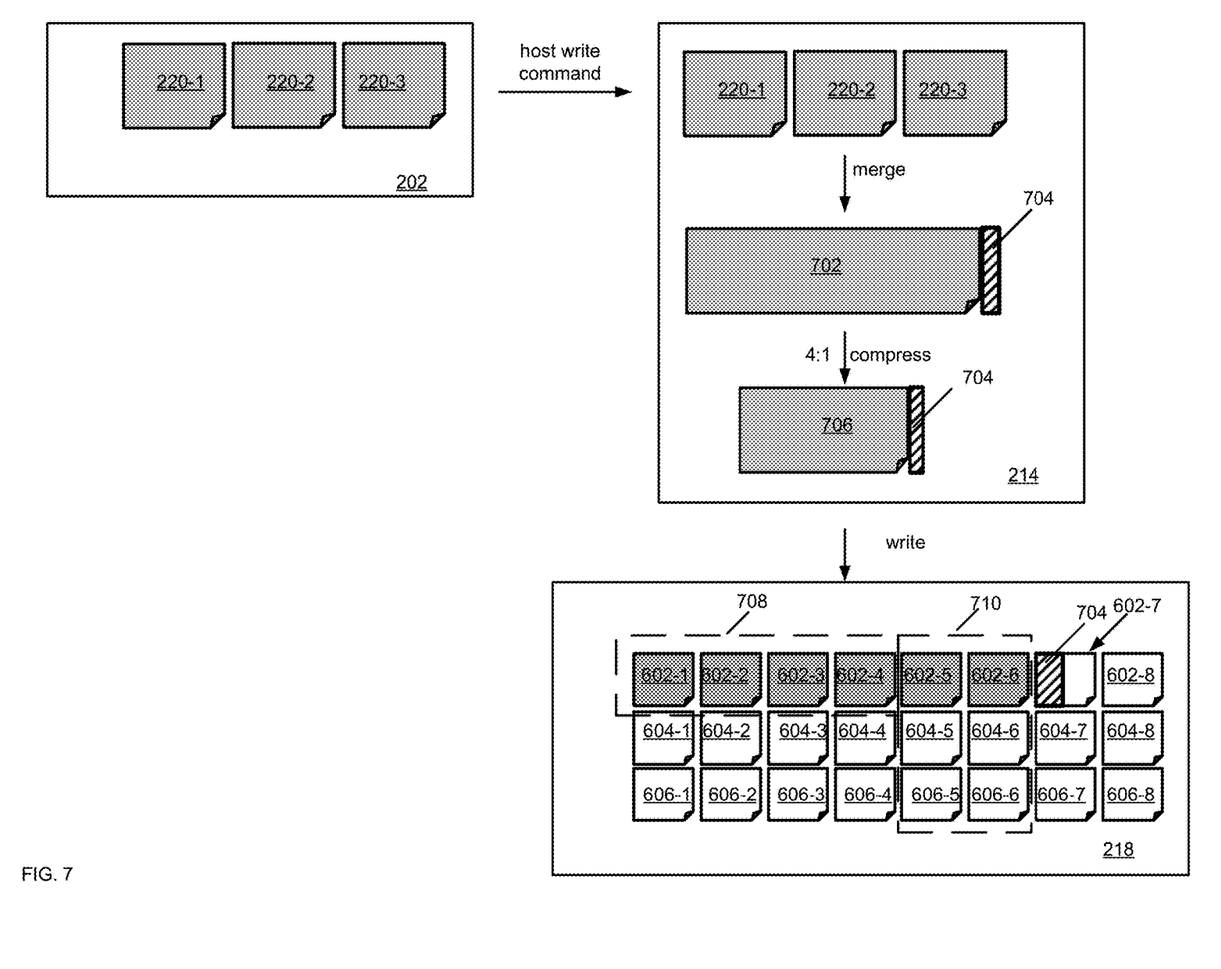
FIG. 7 is a block diagram illustrating a portion of the storage system according to some embodiments of the present disclosure.

As shown in the example of FIG. 7, in some embodiments, at process 408, the bridging device 214 may generate a descriptor 704 associated with the compression block 702. In some examples where the number of blocks in each batch is not fixed, the descriptor 704 may include the number of blocks merged in the particular batch for the compression block 702. In some examples where the blocks in the batch have different sizes, the descriptor 704 may include the start and end offset of each block. Alternatively, in some examples where the blocks in the batch have the same size, the descriptor 704 may not include such start and end offset of each block. In some embodiments, the bridging device 214 may store the descriptor 704 in a descriptor table 302B in the storage device 302. In an example, the bridging device 214 may perform the mapping functions 308 for generating and storing the descriptor 704. In some embodiments where the number of blocks in each batch is fixed and the blocks in the patches have the same fixed size, the descriptor 704 may not be generated. After performing process 408, the method 400 may then proceed to process 410.

Figure 8:
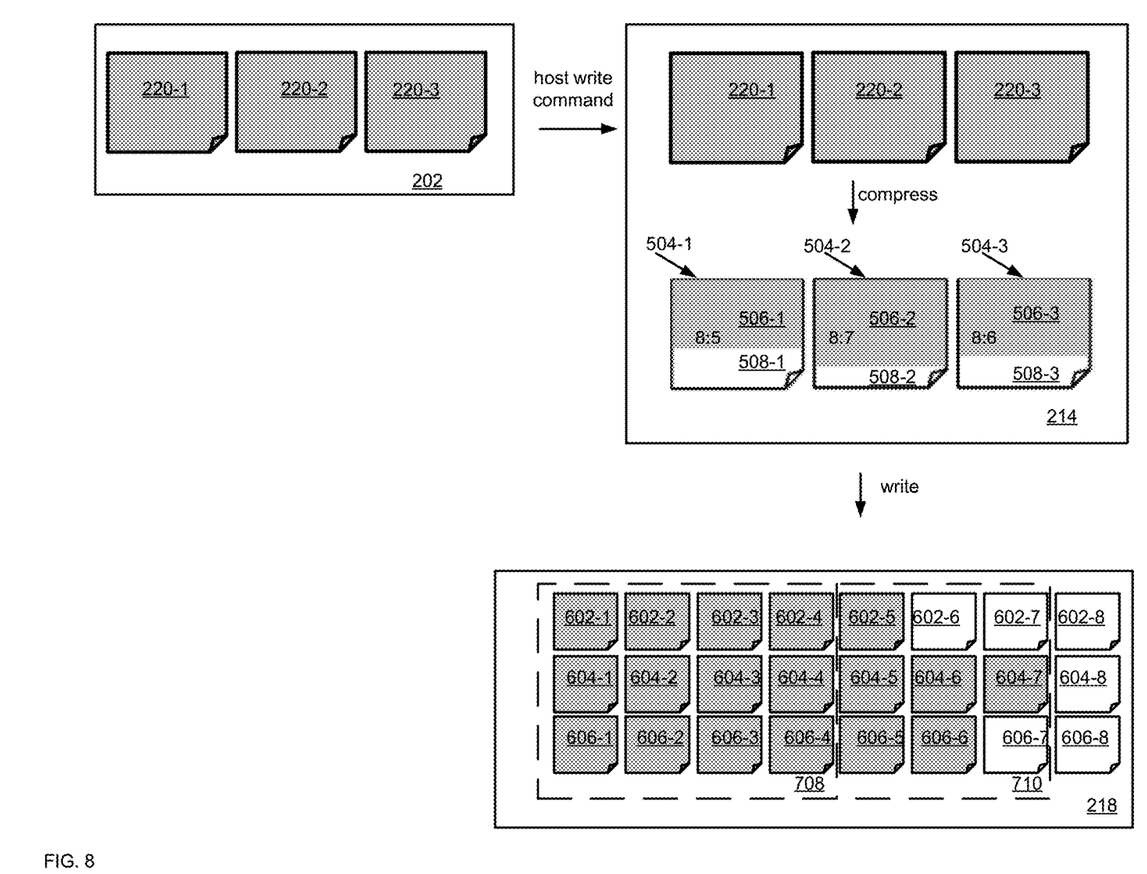
FIG. 8 is a block diagram illustrating a portion of the storage system according to some embodiments of the present disclosure.

Alternatively, as shown in FIG. 8, in some embodiments, at process 406, the bridging device 214 may determine that the storage system 200 is not operating in a batch mode. In some examples, the storage system 200 may not operate in the batch mode where the database application on the hosts 202 requires read/write operations to random data. In such embodiments, the compression block is the same as the received host data block, and the compression block size is the same as the host data block size. The method 400 may then proceed to process 410 without performing any batch operations (e.g., merging blocks in a batch to generate a merged compression block).

At process 410, the bridging device 214 may assign best-case sub-blocks and overflow sub-blocks of the storage devices 218 for the compression blocks (e.g., compression block 702 of FIG. 7, compression blocks 220-1, 220-2, and 220-3 in the bridging device 214 of FIG. 8).

In some embodiments, at process 410, the bridging device 214 may assign one or more sub-blocks of the storage devices 218 as best-case sub-blocks for a compression block based on a best-case compression ratio, a compression block size, and/or a sub-block size. The bridging device 214 may determine that a best-case compression ratio equals to P:1 (e.g., 2:1, 3:1) based on a particular compression algorithm applied during a compression process 410, where P is a number greater than one. The corresponding best-case space savings may be computed as (P−1)/P (e.g., 1/2, 2/3).

Referring to the example of FIG. 7, at process 410, the bridging device 214 may determine that a best-case compression ratio equals 6:1. As such, for a compression block 702 having a size of 3*4 kB, the best-case compressed data have a size of 2 kB. Accordingly, four sub-blocks (e.g., sub-blocks 602-1, 602-2, 602-3, and 602-4) each having a size of 512B may be assigned as best-case sub-blocks 708 for the compression block 702.

Referring to the example of FIG. 8, at process 410, the bridging device 214 may determine that a best-case compression ratio equals 2:1. As such, for each of the compression blocks 220-1, 220-2, and 220-3 that has a size of 4 kB, the best-case compressed data have a size of 2 kB. Accordingly, four sub-blocks in the storage device 218 each having a size of 512 bytes may be assigned as best-case sub-blocks 708 for each compression block. For example, sub-blocks 602-1 through 602-4 may be assigned as best-case sub-blocks for the compression block 220-1. For further example, sub-blocks 604-1 through 604-4 may be assigned as best-case sub-blocks for the compression block 220-2, and sub-blocks 606-1 through 606-4 may be assigned as best sub-blocks for the compression block 220-3.

In some embodiments, at process 410, the bridging device 214 may assign overflow sub-blocks 710 for the compression blocks in addition to the assigned best-case sub-blocks 708. At this stage, bridging device 214 does not have knowledge of how many total sub-blocks (including both assigned best-case sub-blocks 708 and assign overflow sub-blocks 710) will be used to store the corresponding compressed data, because overflow sub-blocks 710 are assigned before the subsequent compression, and actual compression ratios may be different for different compression blocks. However, as discussed above, actual compression ratios may be equal to or less (worse) than the best-case compression. As such, at this stage, while the bridging device 214 does not have knowledge of how many overflow sub-blocks 710 will be used to store the corresponding compressed data, it has knowledge that all of the best-case sub-blocks 708 will be used to store the corresponding compressed data. Therefore, in some embodiments, the bridging device 214 may maintain an overflow sub-block table (e.g., in its storage device 302) that include a list of all assigned overflow sub-blocks and their status (e.g., used by a particular compression block, unused). On the other hand, the bridging device 214 may not maintain a similar table for the assigned best-case sub-blocks 708, because all of those assigned best-case sub-blocks 708 may be used to store the corresponding compression data.

In an example, overflow sub-blocks are assigned for a particular compression block, and may be used to store data associated with that particular compression block. In another example, overflow sub-blocks are assigned for a group of compression blocks, and may be used to store data associated with that group of compression blocks. As discussed above, actual compression ratios may be equal to or less (worse) than the best-case compression ratio. As such, the bridging device 214 may assign a predetermined number of sub-blocks of the storage devices 218 as overflow blocks 710 for storing the additional compressed data (overflow compressed data) when the actual compression ratio is less than the best-case compression ratio. In other words, the compressed data includes the best-case compressed data and the overflow compressed data. As discussed above, the actual compression ratios for different compression blocks may be different, and the number of actual overflow sub-blocks to be actually used to store the overflow compressed data may be different for different compression blocks. In some embodiments, the bridging device 214 may maintain an overflow sub-block table (e.g., in its storage device 302) that include a list of all assigned overflow sub-blocks and their status (e.g., used by a particular compression block, unused). The bridging device 214 may update the overflow sub-block table to keep track of the status of the assigned overflow sub-blocks. For example, when a particular overflow sub-block is actually used by a compression block, the overflow sub-block table is updated to indicate that the particular overflow sub-block is used. For further example, when a particular overflow sub-block is no longer used, the overflow sub-block table is updated to indicate that the particular overflow sub-block is now free.

In various embodiments, the bridging device 214 may determine the number of overflow sub-blocks based on the number of saved sub-blocks in the case of the best-case compression ratio and a predetermined overflow ratio.

Referring to the example of FIG. 7, a best-case compression ratio is 6:1. In the case of the best-case compression ratio, for uncompressed data having a size of 12 k, four sub-blocks (e.g., sub-blocks 602-1, 602-2, 602-3, and 602-4) assigned as best-case sub-blocks 708 may be used to store the compressed data with a size of 2 k. On the other hand, without compression, a total of twenty-four sub-blocks (e.g., sub-blocks 602-1 through 602-8, 604-1 through 604-8, and 606-1 through 606-8) are need to store the uncompressed data of 12 k. As such, in the case of the best-case compression, twenty blocks (e.g., sub-blocks 602-5 through 602-8, 604-1 through 604-8, and 606-1 through 606-8) are saved. The bridging device 214 may determine the number of overflow sub-blocks (e.g., 6) by multiplying the number of saved sub-blocks (e.g., 20) in the case of the best-case compression ratio and a predetermined overflow ratio (e.g., 1/3). The bridging device 214 may assign six (e.g., sub-blocks 602-5, 602-6, 604-5, 604-6, 606-5, and 606-6) of the twenty saved sub-blocks as overflow sub-blocks 710. The bridging device 214 may store the indices and status (e.g., free, used) of these overflow sub-blocks 710 in an overflow sub-block table.

Referring to the example of FIG. 8, at process 410, the bridging device 214 may determine that four sub-blocks may be saved for each compression block in the case of the best-case compression ratio of 2:1. For the three compression blocks 220-1, 220-2, and 220-3, a total of twelve sub-blocks may be saved in the case of the best-case compression ratio of 2:1. The bridging device 214 may determine the number (e.g., 9) of overflow sub-blocks by multiplying the number (e.g., 12) of saved sub-blocks with a predetermined overflow ratio (e.g., 3/4). The bridging device 212 may assign nine sub-blocks (e.g., sub-blocks 602-5 through 602-7, 604-5 through 604-7, and 606-5 through 606-7) of the twelve saved sub-blocks as overflow sub-blocks 710. The bridging device 214 may store the indices and status (e.g., free, used) of these overflow sub-blocks 710 in an overflow sub-block table.

The method 400 may then proceed to process 412, where the bridging device 214 performs compression to the compression blocks to generate compressed blocks. Referring to the example of FIG. 7 where the storage system 200 is operating in a batch mode, at process 412, the bridging device 214 performs compression to the compression block 702 to generate compressed block 706. In some examples, the descriptor 704 is not compressed, and is kept separately from the compressed block 706.

At process 412, in the example of FIG. 8 where the storage system 200 is not operating in a batch mode, at process 412, the bridging device 214 may apply one or more compression algorithms to each of the received host data blocks 220-1, 220-2, and 220-3 to generate compressed blocks 504-1, 504-2, and 504-3. In other words, in such embodiments, the compressed block is the same as the received host data block, and the compressed block size is the same as the host data block size. In some embodiments, the compressed block size remains the same as the original host block size before a compressed block gets written as smaller blocks.

The method 400 may then proceed to process 414, where the bridging device 214 may send a write command to the storage devices 218 to write at least a portion of the compressed data to those best-case sub-blocks of the storage devices 218.

At process 414, in the example of FIG. 7, the bridging device 214 may generate a write command to write at least a portion (e.g., 2 kB) of the compressed data (e.g., 3 kB) in the compressed block 706 to the best-case sub-blocks 708 including sub-blocks 602-1 through 602-4.

At process 414, in the example of FIG. 8, the bridging device 214 may generate write commands to write at least a portion (e.g., 2 kB) of each compressed data 506-1, 506-2, and 506-3 to the assigned best-case sub-blocks for the compressed blocks 504-1, 504-2, and 504-3 respectively. As illustrated in FIG. 8, a portion (e.g., 2 kB) of the compressed data 506-1 is written to the best-case sub-blocks 602-1 through 602-4 of the storage devices 218.

The method 400 may then proceed to process 416, where the bridging device 214 may determine actual overflow sub-block numbers (e.g., based on the size of overflow compressed data and the sub-block size). The bridging device 214 may then retrieve overflow sub-block indices (e.g., from the overflow sub-block table in its storage device 302) of free overflow sub-blocks according to the actual overflow sub-block numbers, and write the overflow compressed data to the corresponding overflow sub-blocks of the storage devices 218.

In the example of FIG. 7, the best-case compression ratio is 6:1 and the actual compression ratio is 4:1. As such, the compressed data of the compressed block 706 have a size of 3 kB, including best-case compressed data of 2 kB and overflow compressed data of 1 kB. At process 416, the bridging device 214 may determine that two actual overflow sub-blocks (each having 512 bytes) are needed for storing the overflow compressed data of 1 kB. The bridging device 214 may retrieve, from the overflow sub-block index table, two overflow sub-block indices corresponding to two free overflow sub-blocks (e.g., sub-blocks 602-5 and 602-6). The bridging device 214 may then send a write command including the overflow compressed data and the retrieved overflow sub-block indices to the storage devices 218 (e.g., through the fabric 216). In response to receiving the write command, the storage devices 218 may store the overflow compressed data to overflow sub-blocks 602-5 and 602-6.

Note that in the example of FIG. 7, at process 416, the bridging device 214 may also write the descriptor 704 to a sub-block (e.g., sub-block 602-7). In an example, the sub-block 602-7 for storing the descriptor 704 is neither an assigned best-case sub-block nor an assigned overflow sub-block.

In the example of FIG. 8, the best-case compression ratio is 2:1, and the actual compression ratios for compression blocks 220-1, 220-2 and 220-3 are 8:5, 8:7, and 8:6 respectively. In an example, the compressed data 506-1 of the compressed block 504-1 includes best-case compressed data of 2 kB and overflow compressed data of 512 bytes. The bridging device 214 may determine that one actual overflow sub-block is needed for storing the overflow compressed data of 512 bytes. The bridging device 214 may retrieve, from the overflow sub-block index table, one overflow sub-block index corresponding to one free overflow sub-blocks (e.g., sub-block 602-5). The bridging device 214 may then send a write command including the overflow compressed data and the retrieved overflow sub-block index to the storage devices 218 (e.g., through the fabric 216). In response to receiving the write command, the storage devices 218 may store the overflow compressed data of the compressed block 504-1 to overflow sub-block 602-5.

In some examples, the compressed data 506-2 of the compressed block 504-2 includes best-case compressed data of 2 kB and overflow compressed data of 1536 bytes. The bridging device 214 may determine that three actual overflow sub-blocks are needed for storing the overflow compressed data. The bridging device 214 may retrieve, from the overflow sub-block table, three overflow sub-block indices corresponding to three free overflow sub-blocks (e.g., sub-blocks 604-5, 604-6, and 604-7). The bridging device 214 may then send a write command including the overflow compressed data and the retrieved overflow sub-block indices to the storage devices 218 (e.g., through the fabric 216). In response to receiving the write command, the storage devices 218 may store the overflow compressed data of the compressed block 504-2 to overflow sub-blocks 604-5, 604-6, and 604-7.

In some examples, the compressed data 506-3 of the compressed block 504-3 includes best-case compressed data of 2 kB and overflow compressed data of 1 kB. The bridging device 214 may determine that two actual overflow sub-blocks are needed for storing the overflow compressed data. The bridging device 214 may retrieve, from the overflow sub-block index table, two overflow sub-block indices corresponding to two free overflow sub-blocks (e.g., sub-blocks 606-5 and 606-6). The bridging device 214 may then send a write command including the overflow compressed data and the retrieved overflow sub-block indices to the storage devices 218 (e.g., through the fabric 216). In response to receiving the write command, the storage devices 218 may store the overflow compressed data of the compressed block 504-3 to overflow sub-blocks 606-5 and 606-6.

The method 400 may then proceed to process 418, where the bridging device 214 may update the mapping tables (e.g., the overflow sub-block table, the descriptor table) in the storage device 302. In an example, the bridging device 214 may update the overflow sub-block table to indicate that overflow sub-blocks (e.g., sub-blocks 602-5, 602-6) used in storing the overflow data are no longer free. In another example, the bridging device 214 may update the overflow sub-block table to free up the overflow sub-blocks in the overflow sub-block table for the overflow sub-blocks that are no longer used (e.g., associated with the old data overridden at process 414).

Figure 9:
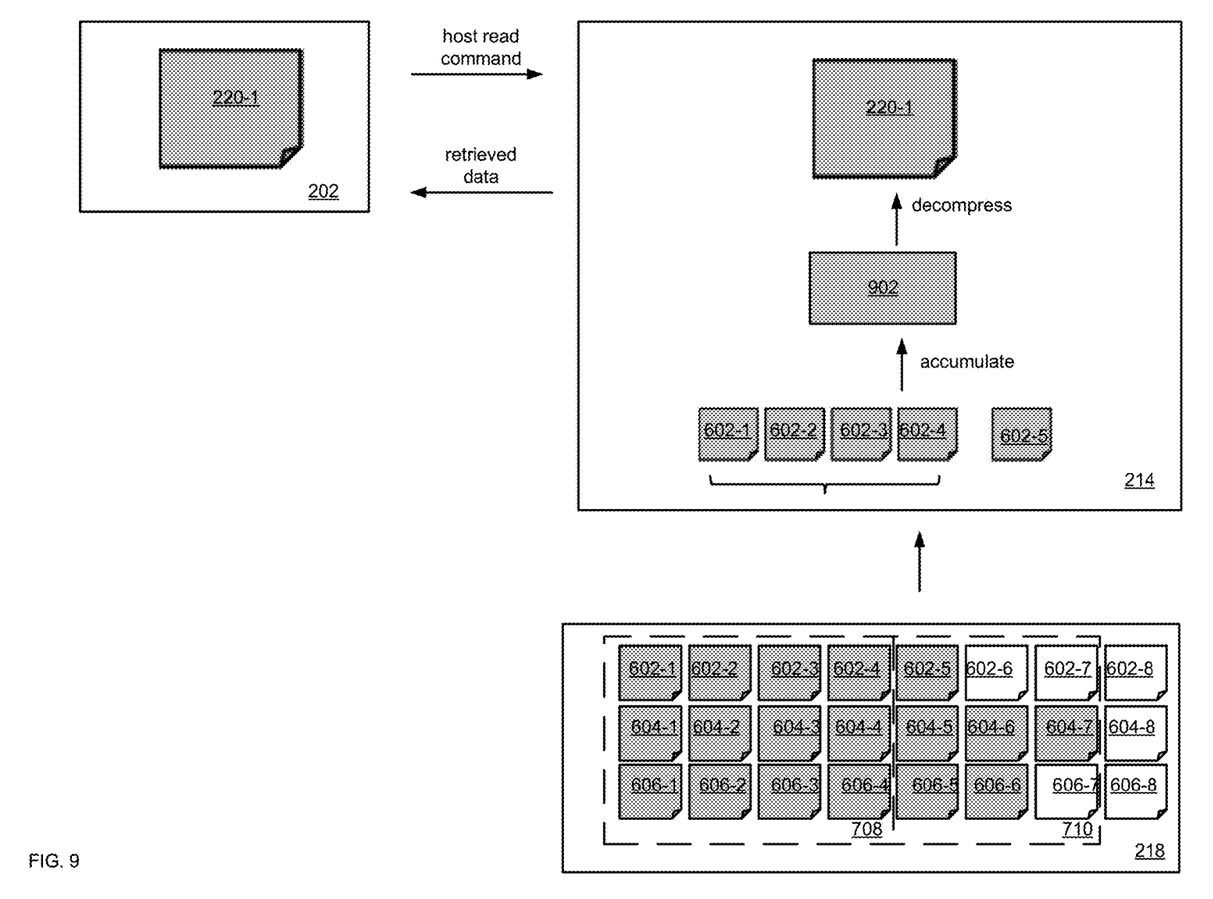
FIG. 9 is a block diagram illustrating a portion of the storage system according to some embodiments of the present disclosure.

Referring to FIG. 4, in some embodiments, the method 400 may proceed to process 420, where the bridging device 214 may receive, from the host 202, a host read command associated with a host data block or a batch including a plurality of host data blocks. While an example of reading a single host data block is used to describe the read process below, reading a batch including a plurality of host data blocks may be substantially similar. Referring to the example of FIG. 9, the bridging device 214 may receive from a host 202 a host read command for reading a host data block 220-1. In the example of FIG. 9, the storage devices 218 have a sub-block size that is 1/8 of the host data block size of the host 202.

The method 400 may proceed to block 422, where the bridging device 214 may read data from best-case sub-blocks of the storage devices 218 that are associated with the host data block 220-1. In the example of FIG. 9, the bridging device 214 reads data (e.g., by sending a read command to the storage devices 218 through the fabric 216) from best-case sub-blocks 602-1 through 602-4 that are associated with the host data block 220-1.

The method 400 may proceed to process 424, where the bridging device 214 may determine whether additional sub-blocks (e.g., overflow sub-blocks, sub-blocks including descriptors) of the storage devices 218 are associated with the host data block 220-1. In some embodiments, as illustrated in the example of FIG. 9, the bridging device 214 may determine (e.g., by using the overflow sub-block table 302A) that an overflow sub-block 602-5 is associated with the host data block 220-1. In some embodiments where the storage system 200 operates in a batch mode, the bridging device 214 may use a descriptor table 302B to determine that the additional sub-blocks include a sub-block storing the descriptor for a particular batch.

In some embodiments, after determining that additional sub-blocks are associated with the host data block 220-1, the method 400 may proceed to process 426, where the bridging device 214 may issue read commands to the storage devices 218 to read those additional sub-blocks. In some examples, the bridging device 214 may retrieve the sub-block indices for those additional sub-blocks from the mapping tables (e.g., the overflow sub-block table 302A, the descriptor table 302B), and the read commands are generated performed based on those retrieved sub-block indices. After data are retrieved from those sub-blocks from the storage devices 218, the method 400 proceeds to process 428.

In some embodiments, after determining that no additional sub-blocks are associated with the host data block 220-1, the method 400 may proceed to process 428.

At process 428, the bridging device 214 may accumulate all the retrieved data, perform a decompression process to generate decompressed data, and send the decompressed data to the host 202. Referring to the example of FIG. 9, at process 428, the bridging device 214 accumulate retrieved data from sub-blocks 602-1, 602-2, 602-3, 602-4, and 602-5 to generate accumulated data 902. A decompression process may be performed to the accumulated data 902 to generate decompressed data for the host data block 220-1. The decompressed data for the host data block 220-1 in a data block having a host data block size may then be sent to the host 202 through network fabrics 210.

In some embodiments where the storage system 200 is operating in a batch mode, at process 428, the bridging device may reconstruct host data blocks in a particular batch from the decompressed data using the descriptor. The reconstructed host data blocks are then sent to the host through the network.

It is noted that various configurations (e.g., the sub-block size, the host data block size, the best compression ratio) illustrated in FIGS. 2-9 are exemplary only and not intended to be limiting beyond what is specifically recited in the claims that follow. It will be understood by those skilled in that art that other configurations may be used. For example, while SSDs have been used as examples of storage devices 218, the storage devices 218 may include disk, flash or other forms of non-volatile memory, SSD-type or magnetic or optical disk media devices or arrays, tape, and/or other applicable storage devices. For further example, while an exemplary storage system 200 may be a non-volatile memory express (NVMe) over Fabric system, the bridging device 214 and the method for accessing storage devices may be used in other systems that use block storage devices. Furthermore, while a PCIe switch fabric is used to describe the fabric 216 between the bridging device and the storage devices 218, any other applicable protocols may be used for the fabric 216.

Although particular embodiments have been shown and described, it will be understood that it is not intended to limit the claimed inventions to the preferred embodiments, and it will be obvious to those skilled in the art that various changes and modifications may be made without department from the spirit and scope of the claimed inventions. The specification and drawings are, accordingly, to be regarded in an illustrative rather than restrictive sense. The claimed inventions are intended to cover alternatives, modifications, and equivalents.

What is claimed is:

1. A data storage system, comprising:
a bridging device configured to:
receive, from a host through a network, a host data block size;
determine a sub-block size based on the host data block size;
configure one or more storage devices to include a plurality of storage sub-blocks each having the sub-block size;
receive, from the host, a first write command to write first host data including one or more host data blocks to the one or more storage devices;
assign one or more overflow sub-blocks of the storage devices for the first host data;
compress the first host data to generate first compressed data;
determine overflow compression data of the first compressed data based on a best-case compression ratio; and
write the first compressed data to one or more storage sub-blocks of the one or more storage devices, wherein the overflow compression data is written to at least a portion of the one or more overflow sub-blocks.

2. The data storage system of claim 1, wherein the first host data includes a first host data block; and
wherein the first compressed data is generated by compressing the first host data block.

3. The data storage system of claim 1, wherein the bridging device is further configured to:
prior to the compressing the first host data, determine one or more best-case sub-blocks of the storage devices based on the best-case compression ratio for the first host data; and
after the compressing the first host data, determine best-case compression data of the first compressed data based on the best-case compression ratio; and
write the best-case compression data to the one or more best-case sub-blocks.

4. The data storage system of claim 3, wherein the bridging device is further configured to:
store overflow sub-block information corresponding to the one or more overflow sub-blocks in an overflow sub-block table;
and
update the overflow sub-block information corresponding to the at least a portion of the one or more overflow sub-blocks in the overflow sub-block table.

5. The data storage system of claim 4, wherein the first host data includes a first batch including a first host data block and a second host data block, and
wherein the bridging device is configured to:
merge the first host data block and the second host data block to generate a compression block; and
compress the compression block to generate the first compressed data.

6. The data storage system of claim 5, wherein the bridging device is configured to:
generate a descriptor including merge information associated with the first and second host data blocks; and
write the descriptor to a descriptor sub-block of the storage devices.

7. The data storage system of claim 6, wherein the bridging device is configured to:
receive, from the host through the network, a host read command to read the batch from the one or more storage devices;
perform a first read command to retrieve first read data from the one or more best-case sub-blocks;
retrieve, from the overflow sub-block table, overflow sub-block information associated with the at least a portion of the one or more overflow sub-blocks;
perform a second read command to retrieve second read data from the one or more storage devices based on the retrieved overflow sub-block information;
merge the first read data and second read data to generate merged read data;
decompress the merged read data to generate decompressed data; and
send, to the host through the network, the decompressed data in blocks having the host data block size.

8. The data storage system of claim 7, wherein the bridging device is configured to:
  retrieve, from the one or more storage devices, the descriptor associated with the batch;
  reconstruct the first host data block and the second host data block from the decompressed data using the descriptor; and
  send, to the host through the network, the reconstructed first host data block and the second host data block.

9. The data storage system of claim 1, wherein the sub-block size is 1/N of the host data block size, where N is an integer greater than one.

10. The data storage system of claim 1, further comprising:
  a Peripheral Component Interconnect Express (PCIe) switch fabric configured to connect the bridging device and the one or more storage devices.

11. A method, comprising:
  receiving, from a host through a network, a host data block size;
  determining a sub-block size based on the host data block size;
  configuring one or more storage devices to include a plurality of storage sub-blocks each having the sub-block size;
  receiving, from the host, a first write command to write first host data including one or more host data blocks to the one or more storage devices;
  assigning one or more overflow sub-blocks of the storage devices for the first host data;
  compressing the first host data to generate first compressed data;
  determining overflow compression data of the first compressed data based on a best-case compression ratio; and
  writing the first compressed data to one or more storage sub-blocks of the one or more storage devices,
    wherein the overflow compression data is written to at least a portion of the one or more overflow sub-blocks.

12. The method of claim 11, wherein the first host data includes a first host data block; and
  wherein the first compressed data is generated by compressing the first host data block.

13. The method of claim 11, further comprising:
  prior to the compressing the first host data, determining one or more best-case sub-blocks based on the best-case compression ratio for the first host data;
  after the compressing the first host data, determining best-case compression data of the first compressed data based on the best-case compression ratio; and
  writing the best-case compression data to the one or more best-case sub-blocks.

14. The method of claim 13, further comprising:
  storing overflow sub-block information corresponding to the one or more overflow sub-blocks in an overflow sub-block table;
  updating the overflow sub-block information corresponding to the at least a portion of the one or more overflow sub-blocks in the overflow sub-block table.

15. The method of claim 14, wherein the first host data includes a batch including a first host data block and a second host data block, further comprising:
  merging the first host data block and the second host data block to generate a compression block; and
  compressing the compression block to generate the first compressed data.

16. The method of claim 15, further comprising:
  generating a descriptor including merge information associated with the first and second host data blocks; and
  writing the descriptor to a descriptor sub-block of the storage devices.

17. The method of claim 16, further comprising:
  receiving, from the host through the network, a host read command to read the batch from the one or more storage devices;
  performing a first read command to retrieve first read data from the one or more best-case sub-blocks;
  retrieving, from the overflow sub-block table, overflow sub-block information associated with the at least a portion of the one or more overflow sub-blocks;
  performing a second read command to retrieve second read data from the one or more storage devices based on the retrieved overflow sub-block information;
  merging the first read data and second read data to generate merged read data;
  decompressing the merged read data to generate decompressed data; and
  sending, to the host through the network, the decompressed data in blocks having the host data block size.

18. The method of claim 17, further comprising:
  retrieving, from the descriptor sub-block of the storage devices, the descriptor;
  reconstructing the first host data block and the second host data block from the decompressed data using the descriptor; and
  sending, to the host through the network, the reconstructed first host data block and second host data block.

19. The method of claim 11, wherein the sub-block size is 1/N of the host data block size.

20. The method of claim 11, further comprising:
  communicating, through a Peripheral Component Interconnect Express (PCIe) switch fabric, with the one or more storage devices.

* * * * *